US008272928B2

(12) United States Patent
Finke et al.

(10) Patent No.: US 8,272,928 B2
(45) Date of Patent: Sep. 25, 2012

(54) DEVICE FOR SEPARATING FILLETS FROM THE SPINAL COLUMN OF BEHEADED, SLAUGHTERED FISH WITH OPEN ABDOMINAL CAVITY BY CUTTING THE BRIDGE LEFT BY ABDOMINAL AND BACK BLADES AROUND THE SPINAL COLUMN AND FILLETING MACHINE COMPRISING SUCH A DEVICE

(75) Inventors: Hans Finke, Luebeck (DE); Michael Juers, Haffkrug (DE)

(73) Assignee: Nordischer Maschinenbau Rud. Baader GmbH & Co.KG, Luebeck (DE)

( * ) Notice: Subject to any disclaimer, the term of this patent is extended or adjusted under 35 U.S.C. 154(b) by 318 days.

(21) Appl. No.: 12/742,240

(22) PCT Filed: Oct. 29, 2008

(86) PCT No.: PCT/EP2008/009351
§ 371 (c)(1),
(2), (4) Date: May 10, 2010

(87) PCT Pub. No.: WO2009/059758
PCT Pub. Date: May 14, 2009

(65) Prior Publication Data
US 2011/0111681 A1    May 12, 2011

(30) Foreign Application Priority Data
Nov. 9, 2007 (DE) .................. 10 2007 053 904

(51) Int. Cl.
*A22C 25/16* (2006.01)

(52) U.S. Cl. ...................................................... 452/161
(58) Field of Classification Search .................. 452/135, 452/160–164
See application file for complete search history.

(56) References Cited

U.S. PATENT DOCUMENTS

| 2,381,560 A | | 8/1945 | Savrda |
| 3,309,730 A | | 3/1967 | Michael |
| 3,680,174 A | * | 8/1972 | Dohrendorf .................. 452/187 |

(Continued)

FOREIGN PATENT DOCUMENTS

DE            943612 C      5/1956

(Continued)

OTHER PUBLICATIONS

International Search Report and opinion for PCT/EP2008/009351.
International Search Report and opinion for PCT/EP2008/009353.

*Primary Examiner* — Richard Price, Jr.
(74) *Attorney, Agent, or Firm* — Venable LLP; Robert Kinberg

(57) ABSTRACT

An apparatus to separate a fillet attached to a backbone of a beheaded, slaughtered fish having an open abdominal cavity previously cut by an abdominal knife and a dorsal knife, by cutting through a web left round the backbone of the fish by the abdominal and dorsal knives. The apparatus includes a transport saddle to transport the previously cut fish in a direction of fish travel wherein the saddle includes an upper bone guide and a lower bone guide. The apparatus also includes a separating unit movable back and forth from a standby position into a working position. The separating unit has a separating device to detach the fillet from the backbone of the fish and a counter support associated with the separating device and arranged on the separating unit with the separating device.

22 Claims, 4 Drawing Sheets

U.S. PATENT DOCUMENTS

| | | | |
|---|---|---|---|
| 4,056,866 A * | 11/1977 | Wenzel | 452/135 |
| 4,825,510 A * | 5/1989 | Braeger | 452/162 |
| 5,149,297 A * | 9/1992 | Braeger et al. | 452/162 |
| 5,207,610 A * | 5/1993 | Ogawa | 452/110 |
| 5,980,376 A * | 11/1999 | Grosseholz et al. | 452/116 |
| 6,322,437 B1 | 11/2001 | Grabau et al. | |

FOREIGN PATENT DOCUMENTS

| | | |
|---|---|---|
| DE | 1454087 A1 | 2/1969 |
| DE | 19745891 | 4/1999 |
| DE | 19881497 C1 | 4/2003 |
| GB | 872801 | 7/1961 |
| WO | WO 02/03807 | 1/2002 |

* cited by examiner

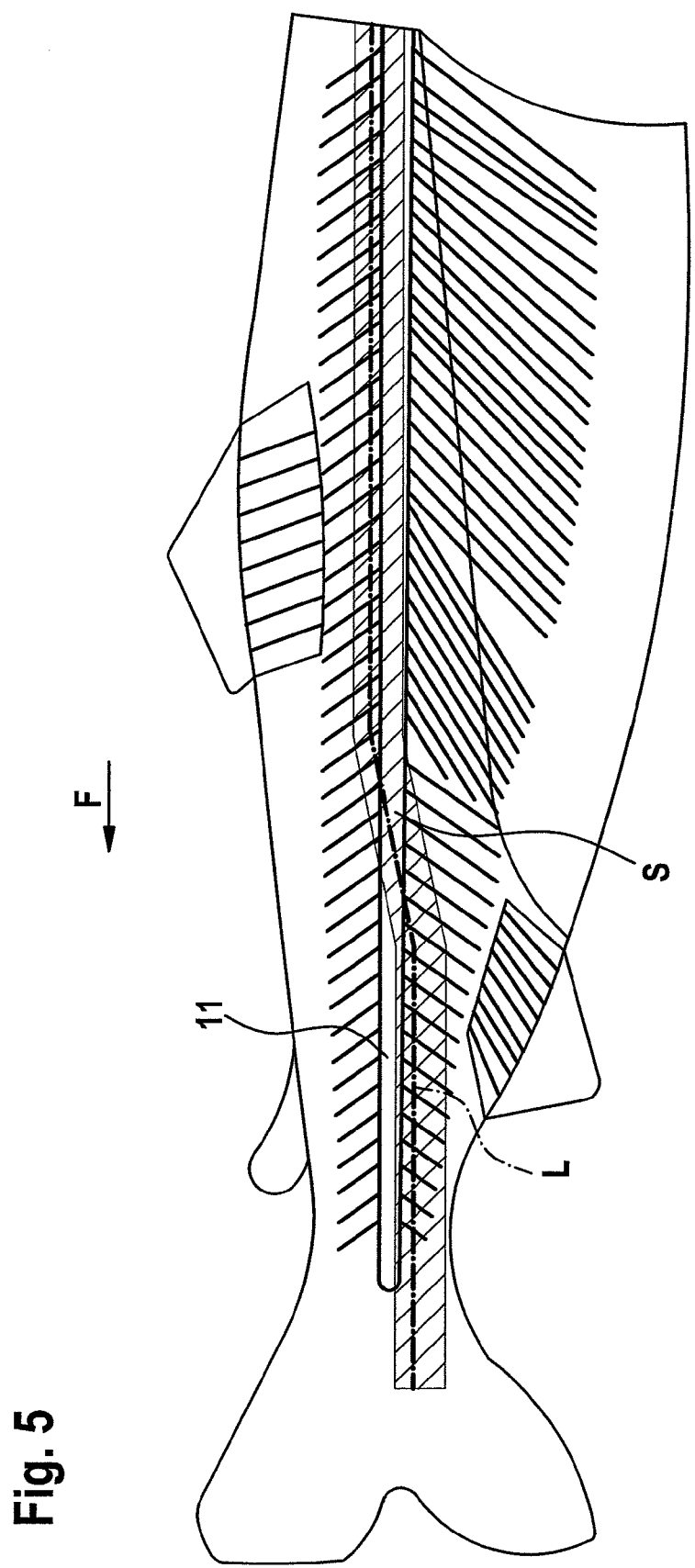

DEVICE FOR SEPARATING FILLETS FROM THE SPINAL COLUMN OF BEHEADED, SLAUGHTERED FISH WITH OPEN ABDOMINAL CAVITY BY CUTTING THE BRIDGE LEFT BY ABDOMINAL AND BACK BLADES AROUND THE SPINAL COLUMN AND FILLETING MACHINE COMPRISING SUCH A DEVICE

CROSS-REFERENCE TO RELATED APPLICATIONS

This application is a National Stage Application of PCT/EP2008/009351, filed Oct. 29, 2008, which designates the United States and claims the priority of German patent application DE 10 2007 053 904.7, filed on Nov. 9, 2007, the subject matter of which is incorporated herein by reference.

BACKGROUND

The invention concerns an apparatus for separating fillets from the backbones of beheaded, slaughtered fish having open abdominal cavities, cutting through the web left round the backbone by abdominal and dorsal knives, the fish being transported on transport saddles, comprising an upper bone guide, a lower bone guide and a separating unit which comprises, for detaching the fillets from the backbone, a separating means with which is associated a corresponding counter support, wherein the separating unit is movable out of a standby position into a working position and back. Furthermore the invention concerns a filleting machine for filleting beheaded, slaughtered fish having open abdominal cavities, comprising dorsal knives for exposing the back spokes as far as the backbone, abdominal knives for exposing the belly spokes in the tail region as far as the backbone, an apparatus for cutting the flank bones free, an apparatus for separating the fillets from the backbone, cutting through the web left round the backbone by abdominal and dorsal knives, an endless conveyor for transport of the fish tail first and a number of fish saddles arranged on the conveyor for reliably receiving the fish in their abdominal cavities.

Such apparatuses are used in the fish-processing industry to fillet fish automatically, particularly the salmon species. The fish are usually transported by means of transport saddles to the individual processing stations, inter alia the apparatus for separating fillets from the backbone. An essential working step is complete separation of fillets which have already been partly detached from the backbone by means of belly cuts and back cuts. After performing the belly cuts and back cuts, a web remains round the backbone. By means of the apparatus for separating the fillets from the backbone, which is also referred to as a separating tool, the web can be separated from the tail region, that is, the tail fin, up to the beginning of the abdominal cavity, so that the fillets are completely detached from the backbone and fall e.g. onto a conveyor belt or the like arranged below the apparatus. The upper and lower bone guides serve to keep and guide the fish in the optimum processing position on the transport saddle. The separating unit is usually arranged on both sides of the fish to be processed, so that the fillets can be separated from the backbone in parallel or with a time delay.

German patent document DE 198 81 497 C1 discloses a filleting machine in which the apparatus for separating the fillets from the backbone has, apart from the necessary bone guides, a separating unit which has two parallel, spaced-apart circular knives. The circular knives are movable out of an upper position above the lower bone guide into a lower position and vice versa, the circular knives further being displaceable in the axial direction relative to each other. The yielding movement in the axial direction takes place against a spring element. The cutting counter supports for the circular knives are arranged in the region of the lower bone guide independently of the circular knives. The cutting counter supports for their part are pivotable about a pivot point. In the processing position the circular knives are each located between an inner and an outer cutting counter support. In order to move out of the lower processing position into the upper standby (or yielding) position, the circular knives are lifted, while the cutting counter supports remain in the lower position. For yielding, the cutting counter supports are mounted rotatably at their own pivot point. In other words, the circular knives are movable independently of the cutting counter support. As a result, particularly during processing the circular knives run up to the cutting counter supports, as a result of which the circular knife, cutting counter support and fin guide plate are subject to wear. Also, control of the known separating unit is expensive particularly due to the large number of elements to be controlled.

SUMMARY

It is therefore an object of the present invention to provide an easy-to-handle, low-wear apparatus by means of which the fillets can be safely and reliably separated from the backbone.

This object is achieved by an apparatus having the features mentioned hereinbefore by the fact that the counter support is arranged on the separating unit. Due to coupling of the counter support to the separating unit, the circular knives are effectively prevented from running up to the counter supports, so that there is no wear. To put it another way, the counter support performs the movements of the circular knife with it, so that a relative movement between circular knife and counter support is avoided. Furthermore, the control costs due to coupling the counter support to the circular knife are reduced.

In an embodiment of the invention the two part units of the separating unit may be located opposite each other on both sides of the fish to be processed and each mounted pivotably about a pivot axis. Due to this design, the effect of easy control and handling is assisted.

The two part units may be assigned at least one adjusting element for performing the pivot movement about the respective pivot axis. This design ensures in a surprisingly simple manner that the position of the circular knives is variable particularly during the separating cut, in order to have regard e.g. for the different geometries of the fish.

In a further embodiment, at least one of the two part units may be assigned a compensating element, such that the distance between the two part units is variable independently of the adjusting element. As a result, the effect of individual positioning of the circular knives in relation to the fish to be processed, as described above, can be reinforced.

Advantageously, the circular knives may be on the one hand pivotable about the respective pivot axis and on the other hand stationary in the axial direction. Due to relinquishing displacement of the circular knives in the axial direction, on the one hand the mechanical expenditure of the apparatus is reduced, and on the other hand control of the separating unit is made easier. Furthermore, due to the constant distance between circular knife and counter support achieved as a result, an improved cutting guide is ensured.

In another embodiment a knife cover may be arranged on the separating unit for each circular knife. By this means the control costs are additionally reduced. Furthermore, due to coupling the knife covers to the separating unit, the circular knives are prevented from running up to the knife covers, avoiding wear.

Advantageously, the knife covers together with the circular knives may be mounted pivotably about the respective pivot axis of the part unit. By combining the pivot axes of circular knife, counter support and knife cover, the control costs are further reduced.

In another of the invention a detection means for detecting an incoming fish may be arranged in front of the separating unit in the direction of fish travel. As a result, the distance between the circular knives which is necessary for the separating cut has to be adjusted only when the fish lies securely with its tail fin between the circular knives.

The object may also be achieved by a filleting machine of the kind mentioned hereinbefore by the fact that the apparatus for separating the fillets from the backbone, cutting through the web left round the backbone by abdominal and dorsal knives. The resulting advantages have already been described in connection with the device, so that reference is made to the corresponding passages, to avoid repetition.

BRIEF DESCRIPTION OF THE DRAWINGS

Further appropriate and/or advantageous features are apparent from the subsidiary claims and the description. An additional embodiment is described in more detail with the aid of the attached drawings. The drawings show:

FIG. 5 is an embodiment of a schematic view of the cutting guide for separating the fillets.

BRIEF DESCRIPTION

Figure 1:
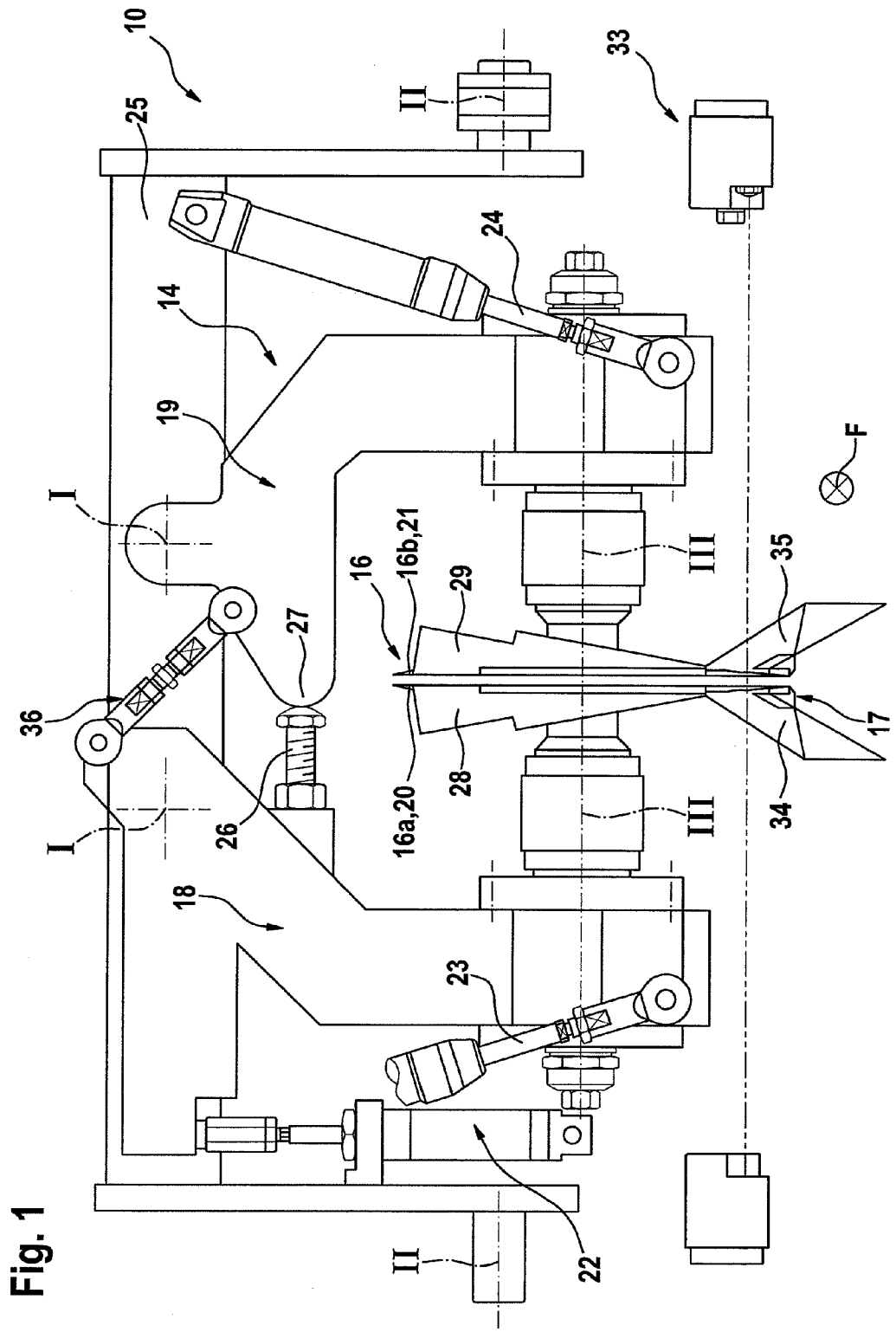
FIG. 1 is one embodiment of a view of the apparatus according to the invention in the direction of fish travel.
Figure 2:
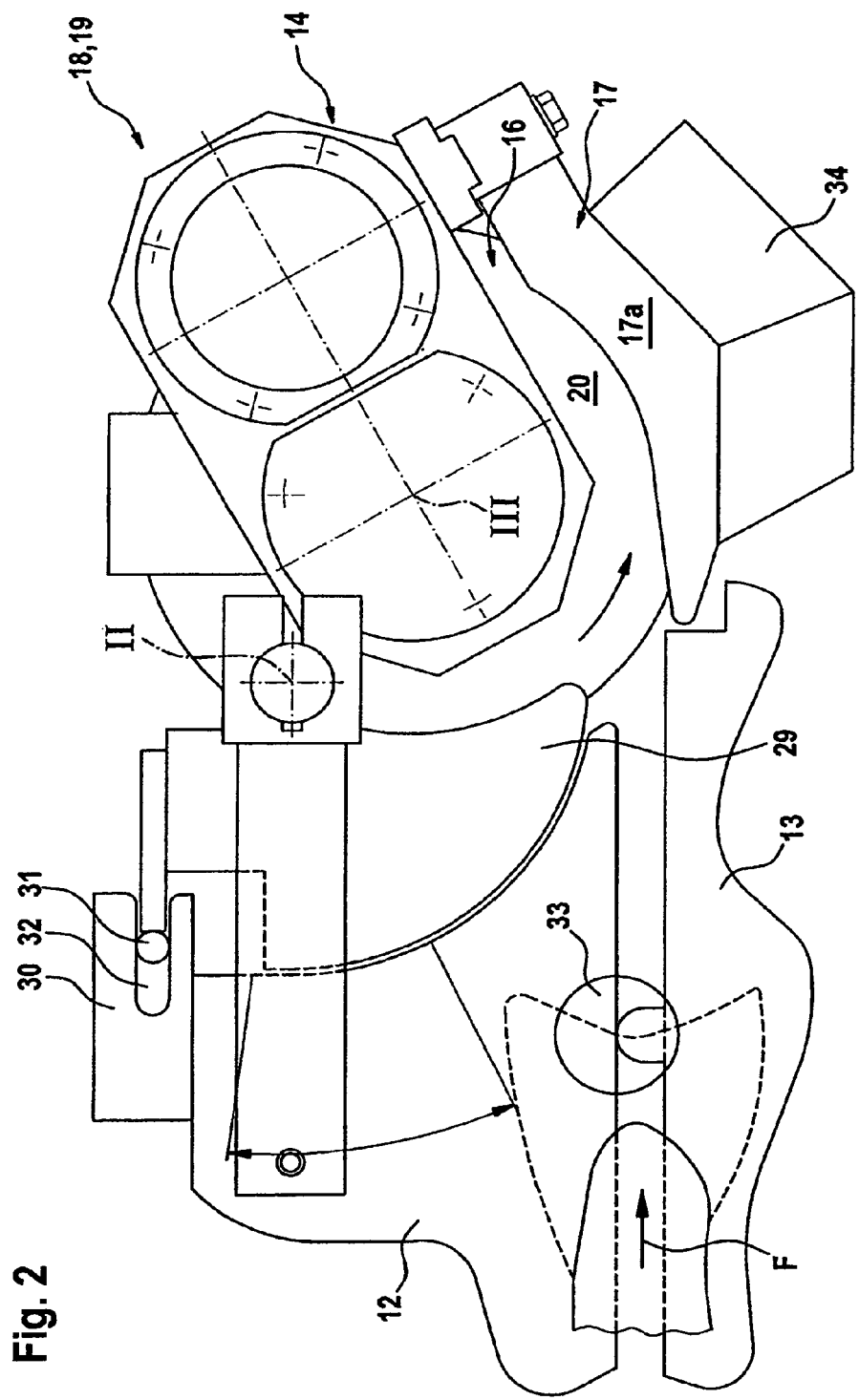
FIG. 2 is an embodiment of a side view of the apparatus according to FIG. 1.
Figure 3:
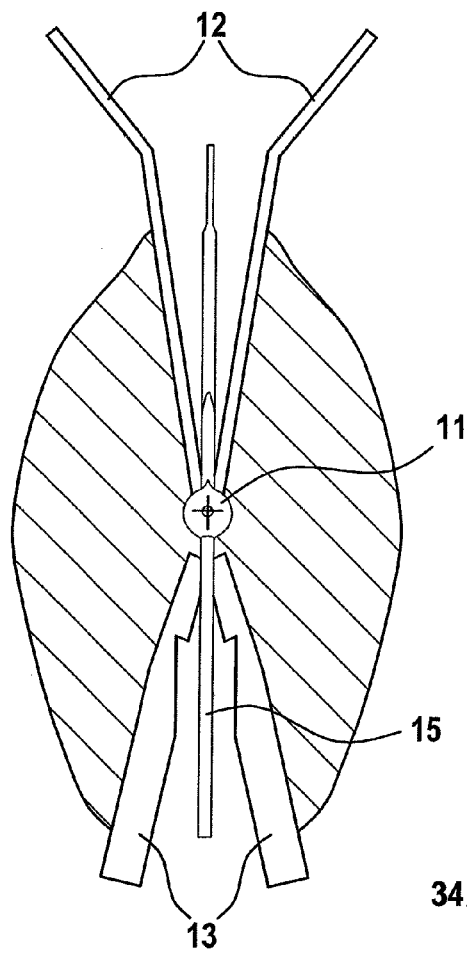
FIG. 3 is an embodiment of a sectional view through a fish before processing.
Figure 4:
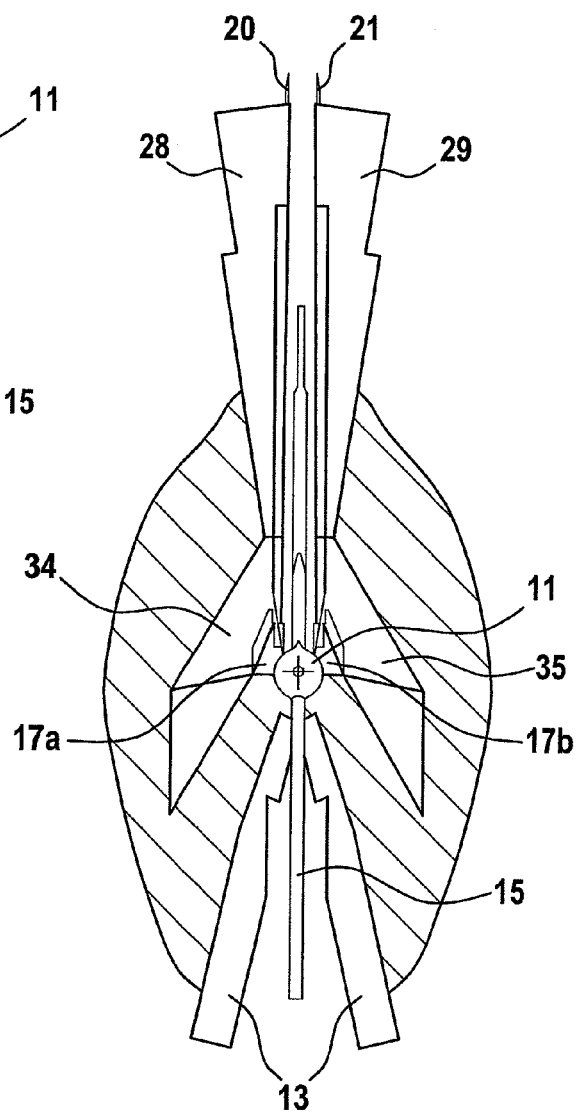
FIG. 4 is an embodiment of the sectional view of the fish according to FIG. 3 with the separating unit in the processing position.

The apparatus shown in the drawings serves to completely separate fillets from the backbones of beheaded, slaughtered fish of the salmon species having open abdominal cavities. Naturally, the apparatus can also be used to separate fillets of other species. Even though the apparatus is described by the example of a fish transported tail first in the direction of fish travel, the fish can also be transported and processed head-first.

In FIG. 1 is shown an apparatus. 10 for separating fillets from the backbones 11 of beheaded, slaughtered fish having open abdominal cavities. The apparatus 10 includes an upper bone guide 12, a lower bone guide 13 and a separating unit 14 for detaching the fillets from the backbone 11. By means of the bone guides 12, 13 the fish to be processed, which is usually transported on a transport saddle 15 into the region of the separating unit 14, is kept in a defined position such that the fish lies in a defined position in relation to the separating unit 14. The lower bone guide 13 is usually stationary and fixed. The upper bone guide 12 is, on the one hand, fixed. But on the other hand the upper bone guide 12 is also movable such that the upper bone guide 12 can yield upwardly, for example dependent on the diameter of the backbone 11.

The separating unit 14 is movable out of an upper standby position in which engagement in the fish is prevented, into a lower processing position in which the separating unit 14 detaches the fillets from the backbone 11, and vice versa. The separating unit 14 comprises a separating means 16 by means of which the actual detachment operation takes place. For this purpose the separating means 16 is assigned a corresponding counter support 17. Preferably the separating unit 14 comprises two part units 18, 19 which each have a separating means 16a and 16b. Each separating means 16a, 16b is in turn assigned a corresponding counter support 17a and 17b. In particular circular knives 20, 21 are provided as the separating means 16a, 16b. Like the circular knives 20, 21, the counter supports 17a, 17b are also arranged on the separating unit 14 and movable with the latter out of the standby position into the processing position and vice versa.

The two part units 18, 19 lie on opposite sides in relation to the fish to be processed. The diametrically opposed part units 18, 19 are each mounted pivotably about a pivot axis I. The pivot axes I run essentially parallel to the bone guides 12, 13. To put it another way, the pivot axes I point in the direction of fish travel F, so that the two part units 18, 19 can, as it were, be pivoted towards and away from each other. To perform pivot movements about the pivot axis I, the two part units 18, 19 in the shown practical example are assigned one adjusting element 22. The adjusting element 22 can be designed as a pneumatic cylinder or the like. As the two part units 18, 19 have a common adjusting element 22, the two part units 18, 19 are operatively connected by a synchronising device 36, so that the adjusting movement acting on one part unit 18 can be transmitted to the other part unit 19. Naturally, each part unit 18, 19 can also be assigned separate adjusting elements 22, so that in this case the device 36 can be dispensed with.

As mentioned, preferably only one part unit 18 is assigned an adjusting element 22. The latter is operatively connected to the part unit 18 so as to be free from loading. Specifically, the part unit 18 rests as it were loosely on the adjusting element 22, such that it can be lifted off it. At least one of the part units, but preferably both part units 18, 19, is assigned a compensating element 23, 24. The compensating elements 23, 24, which can be designed e.g. as a pressure cylinder, spring or the like, are attached on the one hand to the part units 18, 19 and on the other hand to a stationary frame 25 on which the part units 18, 19 are also mounted pivotably. The compensating movement against the force of the compensating elements 23, 24 can take place independently of the adjusting element 22, so that the distance between the two part units 18, 19 or circular knives 20, 21 is variable. In particular an alternating position for the circular knives 20, 21 can be achieved by means of the adjusting element 22 and/or the compensating elements 23, 24.

As already mentioned, the circular knives 20, 21 are pivotable about the pivot axes I together with the part units 18, 19 by means of the adjusting element 22 and/or by means of the compensating elements 23, 24. On the other hand, in the axial direction, and therefore in the direction of the axis of rotation III, the circular knives 20, 21 are stationary. To put it another way, the circular knives 20, 21 are axially non-displaceable. During the pivot movement of the part units 18, 19 about the pivot axis I, the circular knives 20 or 21 and the corresponding counter supports 17a or 17b of a part unit 18 or 19 are fixed relative to each other. This means that no relative movement takes place between circular knives 20, 21 and counter supports 17a, 17b. The pivot movement of the part units 18, 19 towards and away from each other is however limited by a stop element 26 to maintain a minimum distance between the part units 18, 19 or, to be more precise, between the circular knives 20, 21. The stop element 26, which can be for example an adjusting screw, is assigned to one of the two part units 18 and operatively connected to a projection 27 of the other part unit 19.

In addition to the pivot movements described about the pivot axis I for adjusting the gap between the circular knives 20, 21 and for positioning the circular knives, taking into account the geometry of the fish to be processed, both part units 18, 19 are further pivotable about a pivot axis II out of an upper standby position into a lower processing position and vice versa. The pivot axis II runs transversely to the bone guides 12, 13. To put it another way, the pivot axis II runs in the direction of the axis of rotation III. Preferably the pivot axes II and the axes of rotation III are parallel to and offset from each other, the pivot axes II being located above the axes of rotation III.

Each circular knife 20, 21 is assigned a knife cover 28, 29, the knife covers 28, 29 being arranged on the separating unit 14. This means that the knife covers 28, 29 follow the pivot movements of the separating unit 14. To be more precise, the knife covers 28, 29 together with the circular knives 20, 21 are mounted pivotably about the pivot axis I of the corresponding part unit 18, 19. Furthermore the knife covers 28, 29 are rotatable or pivotable about the axis of rotation III of the circular knives 20, 21. To trigger the pivot movement about the axis of rotation III, the knife covers 28, 29 are operatively connected to the upper bone guide 12. The upper bone guide 12 has a fork-shaped guide element 30 in which a bolt 31, guide pin or the like is guided. The guide element 30 is rigidly connected to the upper bone guide 12. The bolt 31 is movable within the substantially horizontal slot 32 which is open on one side, and rigidly connected to the knife cover 28, 29. As soon as the upper bone guide 12 performs a yielding movement, the knife covers 28, 29 follow this movement, wherein the up and down movement of the bone guide 12 is converted to a pivot movement of the knife covers 28, 29 about the axis of rotation III. This means that the knife covers 28, 29 are movable, namely pivotable relative to the circular knives 20, 21.

To detect when a fish enters the region of the apparatus 10, in front of the separating unit 14 in the direction of fish travel F is arranged a detection means 33. The detection means 33 can be e.g. a light barrier. Other means having a transmitter and a receiver or elements arranged on one side can be used as well. In further embodiments, the counter supports 17a, 17b can be assigned guide elements 34, 35. By means of the guide elements 34, 35, the fully detached fillets can be guided out of the apparatus 10 onto transport means or the like (not shown) arranged below.

The apparatus 10 described above can be used as a single apparatus, as a retrofit kit or as part of a filleting machine.

Below, the principle of the method is described in more detail with the aid of the figures. The fish which is located on the transport saddle 15 and which has already been subjected to the belly cuts and back cuts, is transported tail first in the direction of fish travel F in the direction of the apparatus 10. In order to position/thread the tail fin reliably between the circular knives 20, 21, the circular knives 20, 21 are moved apart. To put it another way, the circular knives 20, 21 are pivoted apart about the pivot axis I, so that the tail fin enters between the circular knives 20, 21. Entry of the fish is detected by means of the detection element 33. Only when the tail fin is located between the circular knives 20, 21, are the latter pivoted to the actual cutting distance. In the cutting position the circular knives 20, 21 are preferably set parallel and given a defined distance apart.

During cutting, the distance between the circular knives 20, 21 can be varied e.g. by the adjusting element 22, by pivoting the part units 18, 19 about the pivot axis I. Alternatively or cumulatively the circular knives 20, 21 can be forced apart e.g. by a bone which is thicker' than the set distance between the circular knives 20, 21, against the force/resistance of the compensating elements 23, 24. The distance from the circular knives 20, 21 to the lower bone guide 13 can be varied by pivoting the part units 18, 19 about the pivot axis II. The pivot axis II, which lies above the lower bone guide 13, is selected such that a pivot movement of the part units 18, 19 takes place with the movement of the transport saddles 15, so that the part units 18, 19 are lifted above the transport saddles 15.

The knife covers 28, 29 prevent bones and fins located above the backbone 11 from being picked up by the circular knives 20, 21. The knife covers 28, 29 are controlled by the upper bone guide 12. To put it another way, the upper bone guide 12 entrains the knife covers 28, 29, which are thus controlled in height according to the size of the incoming fish. In the process the knife covers 28, 29 pivot about the axis of rotation III. The circular knives 20, 21 are pressed against the backbone 11 by the holding force of the compensating elements 23, 24, so that they cut along the backbone 11, sitting close on both sides. Before the transport saddle 15 reaches the circular knives 20, 21, the circular knives 20, 21 must be lifted and guided over the transport saddle 15. Due to previous determination of the fish size and a corresponding control element, the height of the circular knives 20, 21 above the transport saddle 15 can be controlled according to the fish size.

The web which was not separated by the dorsal knife or flank cutter which are both mounted upstream in the direction of fish travel is now separated from the backbone 11 by the counter supports 17a, 17b possibly in connection with the corresponding circular knives 20, 21. Thus the fillets are completely separated from the bone structure including the backbone 11 and drop down on both sides. Due to the guide elements 34, 35, the fillets are guided without disturbance and in the correct position onto a conveyor belt arranged beneath the apparatus 10.

In the event that the fillets detached from the backbone 11 contain rib bones, the two circular knives 20, 21 are moved apart only for this purpose to a distance such that the transport saddle 15 can be conveyed along between the circular knives 20, 21. In height, however, the circular knives 20, 21 remain unchanged.

The course of the circular knives 20, 21 obtained by the method described can be seen with reference to FIG. 5. The broken line L constitutes the path of the circular knives 20, 21 through the fish. The hatched area S round the backbone 11 marks the area in which the circular knives 20, 21 cut through the fillets.

The invention claimed is:

1. An apparatus to separate a fillet attached to a backbone of a beheaded, slaughtered fish having an open abdominal cavity previously cut by an abdominal knife and a dorsal knife, by cutting through a web left round the backbone of the fish by the abdominal and dorsal knives, comprising:
 a transport saddle to transport the previously cut fish in a direction of fish travel, the saddle including an upper bone guide and a lower bone guide; and
 a separating unit movable back and forth from a standby position into a working position, the separating unit including:
  a separating device to detach the fillet from the backbone of the fish, and
  a counter support associated with the separating device and arranged on the separating unit with the separating device.

2. The apparatus according to claim 1, wherein the separating device includes first and second circular knives, the counter support includes first and second counter supports associated respectively with the first and second counter supports, and the separating unit comprises a first part unit and a second part unit, wherein the first part unit includes the first circular knife and the associated first counter support and second part unit includes the second circular knife and the associated second counter support.

3. The apparatus according to claim 2, wherein the first part unit and the second part unit are arranged opposite each other on opposing sides of the fish and the first part unit is pivotably mounted about a first pivot axis and the second part unit is pivotably mounted about a second pivot axis.

4. The apparatus according to claim 3, wherein each pivot axis runs approximately parallel to the upper bone guide and the lower bone guide.

5. The apparatus according to claim 3, and further including at least one adjusting element operatively connected to at least one of the first and second part units to perform a pivot movement of the at least one part unit about the first or second pivot axis respectively.

6. The apparatus according to claim 5, wherein the adjusting element comprises a pneumatic cylinder.

7. The apparatus according to claim 5, further comprising a synchronising device to operatively couple the first part unit to the second part unit, wherein the first and second part units are pivotable by one adjusting element.

8. The apparatus according to claim 5, wherein the first part unit is assigned and operatively coupled to one adjusting element without fastening the first part unit to the one adjusting element.

9. The apparatus according to claim 5, further comprising a compensating element operatively connected to at least one of the first part unit or the second part unit so that a distance between the first part unit and the second part unit is variable independently of the adjusting element.

10. The apparatus according to claim 9, wherein the compensating element comprises first and second compensating elements assigned respectively to the first and second part units, and the first and second compensating elements comprise pressure cylinders.

11. The apparatus according to claim 3, wherein the first circular knife is pivotable about the first pivot axis and rotates about a first rotational axis and is stationary in the axial direction of the first rotational axis and the second circular knife is pivotable about the second pivot axis and rotates about a second rotational axis and is stationary in the axial direction of the second rotational axis.

12. The apparatus according to claim 3, wherein the first counter support is fixed relative to the first circular knife during a pivot movement about the first pivot axis and the second counter support is fixed relative to the second circular knife during a pivot movement about the second pivot axis.

13. The apparatus according to any one of claims 3, and further including a stop element assigned to at least one of the first part unit or second part unit to maintain a minimum distance between the first and second circular knives.

14. The apparatus according to claim 2, wherein the first and second part units are each pivotable up and down about a second pivot axis to pivot between the standby position and the working position, wherein the second pivot axis runs transversely to the lower and upper bone guides.

15. The apparatus according to claim 2, further comprising first and second knife covers arranged on the separating unit for the first and second circular knifes, respectively.

16. The apparatus according to claim 15, wherein the first knife cover with its associated first circular knife is pivotably mounted about the pivot axis of the first part unit and the second cover with its associated second circular knife is pivotably mounted about the pivot axis of the second part unit.

17. The apparatus according to claim 15, wherein the first and second knife covers are operatively coupled to the upper bone guide.

18. The apparatus according to claim 15, wherein the first and second knife covers are movable relative to the first and second circular knives, respectively.

19. The apparatus according to claim 15, wherein the first and second circular knives rotate about a respective rotation axis and the first and second knife covers are pivotable about a respective one of the rotation axes.

20. The apparatus according to claim 1, wherein the transport saddle is adapted to transport the fish tail first in the direction of fish travel.

21. The apparatus according to claim 1, further comprising a detection device to detect incoming fish in the direction of fish travel, the detection device being arranged upstream of the separating unit.

22. A filleting machine for filleting a beheaded, slaughtered fish having an open abdominal cavity, comprising:
   a dorsal knife to expose back spokes of the fish as far as a backbone of the fish;
   an abdominal knife to expose belly spokes of the fish in a tail region as far as the fish backbone;
   a first apparatus to cut away flank bones of the fish;
   a second apparatus to separate a fillet attached to a backbone of a beheaded, slaughtered fish having an open abdominal cavity previously cut by an abdominal knife and a dorsal knife, by cutting through a web left round the backbone of the fish by the abdominal and dorsal knives, comprising:
   a transport saddle to transport the previously cut fish in a direction of fish travel, the saddle including an upper bone guide and a lower bone guide; and
   a separating unit movable back and forth from a standby position into a working position, the separating unit including:
      a separating device to detach the fillet from the backbone of the fish, and
      a counter support associated with the separating device and arranged on the separating unit with the separating device.

* * * * *